(12) United States Patent
Sutivong et al.

(10) Patent No.: US 8,488,566 B2
(45) Date of Patent: Jul. 16, 2013

(54) CONTROL CHANNEL ASSIGNMENT IN A WIRELESS COMMUNICATION NETWORK

(75) Inventors: Arak Sutivong, Bangkok (TH); Sony John Akkarakaran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/445,231

(22) Filed: Apr. 12, 2012

(65) Prior Publication Data

US 2012/0195279 A1  Aug. 2, 2012

Related U.S. Application Data

(63) Continuation of application No. 11/021,695, filed on Dec. 22, 2004, now Pat. No. 8,160,046.

(51) Int. Cl.
*H04B 7/216* (2006.01)

(52) U.S. Cl.
USPC .......................................... 370/335

(58) Field of Classification Search
USPC .................. 370/329–336, 343–344
See application file for complete search history.

(56) References Cited

U.S. PATENT DOCUMENTS

| | | | |
|---|---|---|---|
| 6,421,357 B1 | 7/2002 | Hall | |
| 6,466,561 B1 | 10/2002 | Lee et al. | |
| 6,522,625 B1 | 2/2003 | Hayashi et al. | |
| 8,160,046 B2 | 4/2012 | Sutivong et al. | |
| 2003/0072296 A1 | 4/2003 | Odenwalder et al. | |
| 2004/0001429 A1 | 1/2004 | Ma et al. | |
| 2004/0062193 A1 | 4/2004 | Ma et al. | |
| 2004/0081131 A1 | 4/2004 | Walton et al. | |
| 2004/0082356 A1 | 4/2004 | Walton et al. | |
| 2004/0264507 A1 | 12/2004 | Cho et al. | |
| 2005/0063331 A1 | 3/2005 | Kim et al. | |
| 2006/0146867 A1* | 7/2006 | Lee et al. | 370/465 |
| 2006/0203707 A1 | 9/2006 | Lee et al. | |

FOREIGN PATENT DOCUMENTS

RU  95121152  12/1997
RU  2149518  5/2000

OTHER PUBLICATIONS

International Preliminary Report on Patentability—PCT/US2005/046737, International Bureau of WIPO, Jul. 5, 2007.
International Search Report—PCT/US2005/046737, International Search Authority—European Patent Office—Apr. 25, 2006.
Written Opinion—PCT/US2005/046737, International Search Authority—European Patent Office—Apr. 25, 2006.
Taiwan Search Report—TW094145718—TIPO—Jun. 5, 2012.

* cited by examiner

*Primary Examiner* — Steven Lim
(74) *Attorney, Agent, or Firm* — Kenneth Vu

(57) ABSTRACT

The disclosed embodiments provide for methods and systems for allocating a plurality of users on a control channel in a wireless communication network. In one aspect, a method for allocating a plurality of users on a control channel includes assigning a first number of modulation symbols to a hop region for a control channel, and allocating a second number of users to the first number of modulation symbols.

41 Claims, 4 Drawing Sheets

CONTROL CHANNEL ASSIGNMENT IN A WIRELESS COMMUNICATION NETWORK

BACKGROUND

I. Field

The present invention relates generally to communication, and more specifically to methods and apparatus for efficient control channel assignment in a wireless communication system.

II. Background

Wireless communication systems are widely deployed to provide various communication services such as voice, packet data, and so on. These systems may be multiple-access systems capable of supporting communication with multiple users by sharing the available system resources. Examples of such multiple-access systems include Code Division Multiple Access (CDMA) systems, Multiple-Carrier CDMA (MC-CDMA), Time Division Multiple Access (TDMA) systems, Frequency Division Multiple Access (FDMA) systems, Orthogonal Frequency Division Multiple Access (OFDMA) systems, and so on.

There is therefore a need in the art for methods and apparatus for efficient control channel assignment in a wireless communication system.

SUMMARY

The disclosed embodiments provide for methods and systems for allocating a plurality of users on a control channel in a wireless communication network. In one aspect, a method for allocating a plurality of users on a control channel includes assigning a first number of modulation symbols to a hop region for a control channel, and allocating a second number of users to the first number of modulation symbols.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

Figure 1:
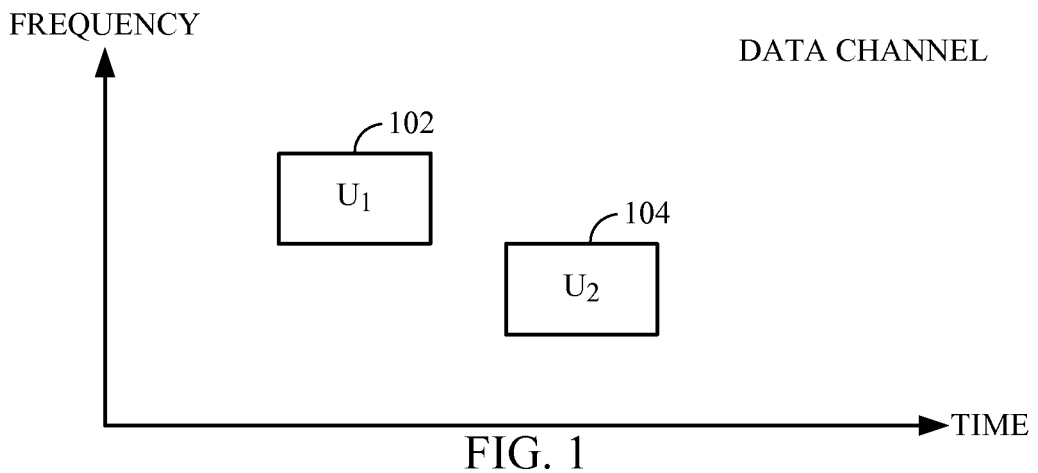
FIG. 1 shows one embodiment for data channel assignment in a communication network.

The word "exemplary" is used herein to mean "serving as an example, instance, or illustration." Any embodiment or design described herein is "exemplary" and is not necessarily to be construed as preferred or advantageous over other embodiments or designs.

An "access terminal" refers to a device providing voice and/or data connectivity to a user. An access terminal may be connected to a computing device such as a laptop computer or desktop computer, or it may be a self contained device such as a personal digital assistant. An access terminal can also be called a subscriber unit, mobile station, mobile, remote station, remote terminal, user terminal, user agent, or user equipment. An access terminal may be a subscriber station, wireless device, cellular telephone, PCS telephone, a cordless telephone, a Session Initiation Protocol (SIP) phone, a wireless local loop (WLL) station, a personal digital assistant (PDA), a handheld device having wireless connection capability, or other processing device connected to a wireless modem.

An "access point" refers to a device in an access network that communicates over the air-interface, through one or more sectors, with the access terminals. The access point acts as a router between the access terminal and the rest of the access network, which may include an IP network, by converting received air-interface frames to IP packets. Access point also coordinates the management of attributes for the air interface.

The disclosed embodiments provide for efficient designs for the control channel in a wireless communication system, e.g., an OFDMA system. The control channel facilitates communication between the access terminal (AT) and the access point (AP), e.g., a reverse link (RL) may be used to carry: a) requests for forward-link resources (e.g., REQ), b) forward-link channel quality indicators (e.g., CQI), and c) acknowledgements (e.g., ACK/NACKs), telling the access point whether or not the access terminal has received the data sent on the forward link, i.e., enabling Hybrid ARQ. Control channels have generally low data rates and payload bandwidth compared to data channels.

In one embodiment, e.g., in a frequency-hopping (FH-OFDMA), a channel may be defined by groups of M subcarriers or tones that hop together once every N modulation symbols. Thus, in the time-frequency plane, a hop region corresponds to a rectangular N×M grid of modulation symbols. The values of M and N may be chosen so that the channel is almost constant over the hop, allowing the channel to be estimated based on pilot symbols inserted in the hop region. The channels may be defined by one or more of such hop regions, which may be assigned to physical sub-carriers by a hop-permutation of periodicity N.

In one embodiment, control channels may have the same structure as the data channels. A single control channel may, however, have capacity to handle control transmissions for multiple users, so the control channel may be shared among multiple users. In one embodiment, each modulation symbol is repeated P times with a P-ary Walsh (or exponential) code overlay. Thus, P different use's can share the same channel, each sending (M*N)/P modulation symbols each with P-ary repetition. In this case, multiple users may be distinguished by their unique Walsh codes. The Walsh-repeated symbols may be placed close to each other in time and frequency so that they see approximately the same propagation channel, and hence, different users remain orthogonal. The modulation symbols may be generated by some symbol-mapping of the control information bits.

FIG. 1 shows one embodiment for data channel assignment in a communication network, e.g., in a FH-OFDMA. A plurality of users may be allocated on one or more data channels in a wireless communication network. In one embodiment, for a data channel, hop regions 102 and 104 are assigned to users U1 and U2, respectively. Users U1 and U2 may transmit data on modulation symbols (sub-carriers) within their respective hop regions for a data channel. In one embodiment, more than one hop region may be assigned to a single user.

Figure 2A:
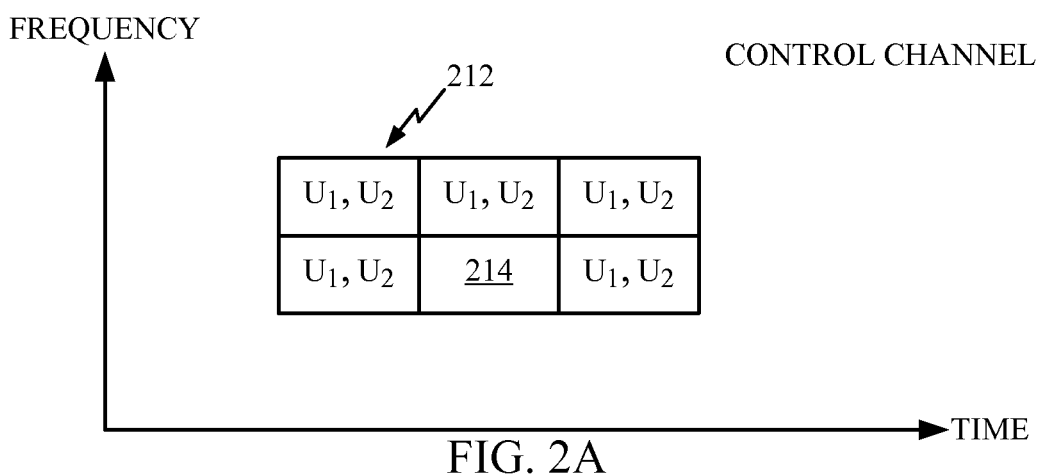
FIG. 2A shows one embodiment for assigning multiple users on the same control channel in a communication network.

In a first embodiment for a control channel assignment, as shown in FIG. 2A, a hop region 212 is jointly assigned to two or more users, e.g., U1 and U2. Users U1 and U2 may jointly transmit control information on the modulation symbols within the hop region 212 for a control channel. In one embodiment, each of a plurality of the users assigned to the same hop region is assigned a unique Walsh code, so that such users may be distinguished from each other. When all users transmit on all modulation symbols within the hop, this embodiment provides for uniform interference to other sectors over the hop region, which helps in reverse-link interference estimation for the purpose of data demodulation.

Figure 2B:
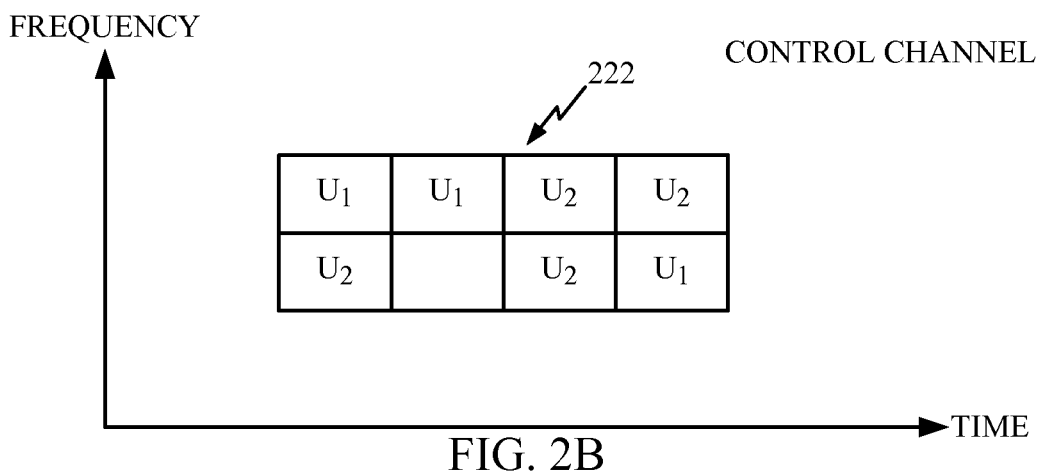
FIG. 2B shows an alternative embodiment for assigning multiple users on the same control channel in a communication network.

In a second embodiment for a control-channel assignment, as shown in FIG. 2B, a hop region 222 is disjointly assigned to two or more users, e.g., U1 and U2. Each user is assigned to one or more unique modulation symbol(s) and may transmit control information on some or all of its assigned modulation symbols within the hop region for a control channel. In one embodiment, users assigned to a hop region may not overlap on the same modulation symbol in the assigned hop region.

In a third embodiment, a combination of the first and second embodiments described above may be used. In the above embodiments, one or more pilot symbol embedded within the control channel, which are used for demodulating the control channel, may be used for reverse-link timing control loop.

For some control channels, e.g., ACK/NACK, where there may be only 1 bit of information, one may use binary phase shift keying (BPSK) or on-off keying (OOK) demodulation techniques. On-off keying may have advantages in case of false forward-link channel assignments, in which case the NACKs of the incorrectly assigned user do not interfere with transmissions of the legitimate owner of the channel. For the ACK/NACK channel, a means of reducing the probability of mistaking NACK for ACK, or vice versa, may be required. An ACK mistaken as a NACK results in an unnecessary retransmission of the packet, whereas a NACK mistaken as an ACK may result in not retransmitting an unreceived packet, causing a packet error. This may be done in BPSK using a biased decision threshold, and in on-off keying by appropriate setting of the decision threshold. For on-off keying, an absolute threshold setting or one based on the long term average interference variance may result in performance being sensitive to interference variations. According to one embodiment, some of the Walsh codes may be reserved, or unallocated to any user, and may be used to obtain an estimate of the interference variance over a hop region. The on-off decision threshold may be set based on this estimate of the current interference variance. If the system is lightly loaded, all the extra unused Walsh codes may be utilized towards the interference measurement. In one embodiment, the AP measures the received power of the reserved Walsh code(s), or the Walsh code(s) un-assigned to any user, and uses such codes in estimating the current interference power on the reverse link. The AP may use the current interference power on the reverse link to set a threshold for on/off keying demodulation of control channels, such as ACK/NAK (1-bit) control channel.

The frequency hopping system may have multiple hop regions in a frame, and frames may be grouped into multiple interlaces of frames disjoint in time. Simultaneous transmissions on independently hopping sub-carrier groups (i.e., multiple data channels) from the same user tends to increase out-of-band emissions due to power amplifier's (PA) non-linearity, which may necessitate higher PA backoffs that translate to link budget reduction. In one embodiment, disjoint set of hop regions within a frame may be assigned to different control channels, e.g., REQ/CQI and ACK/NACK control channels, so that these control channels may not be transmitted simultaneously. In one embodiment, each data channel will be scheduled on one interlace. In one embodiment, the user's control channel hops may be scheduled on a different interlace from the data channel interlace assigned to the same user.

Figure 3:
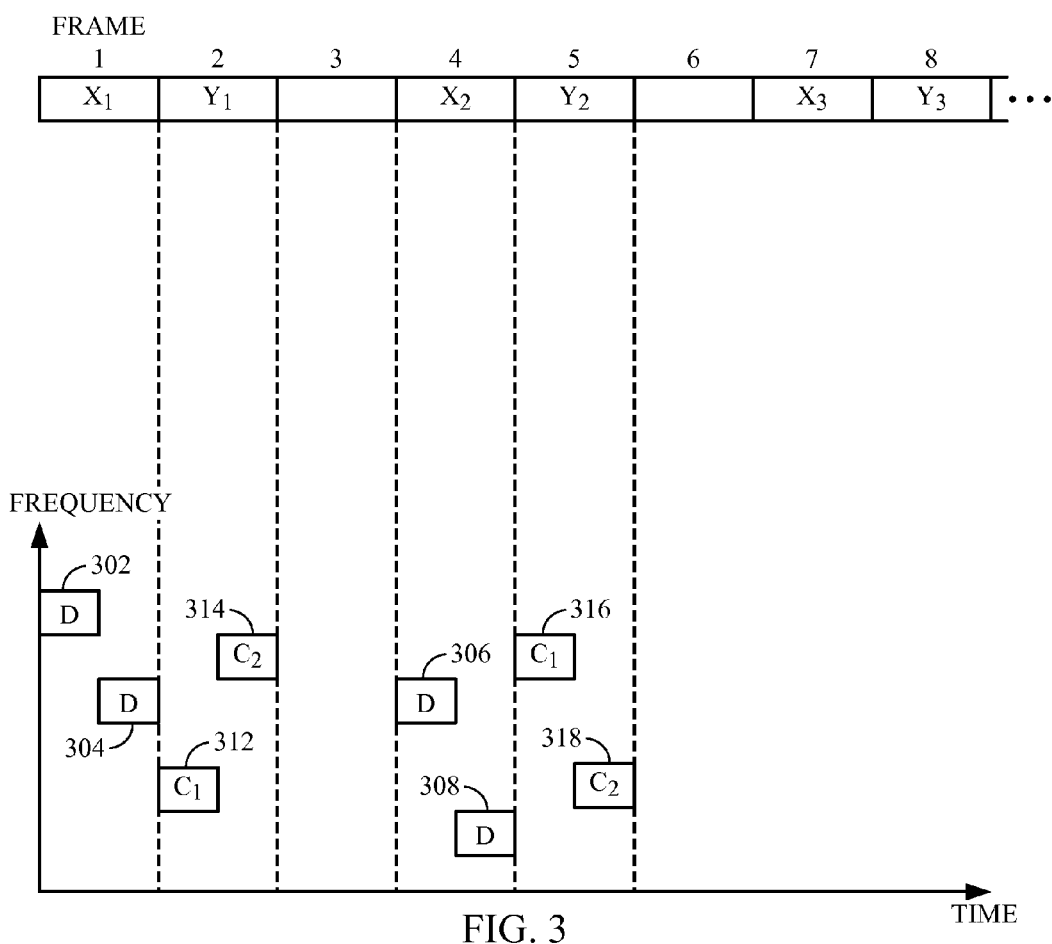
FIG. 3 shows one embodiment for data and control channels assignment in a communication network.

FIG. 3 shows one embodiment for communicating data and control information in interlaced frames, e.g., in an FH-OFDMA wireless communication network. The FH-OFDMA system may have multiple hop regions in a frame, and a number of specific disjoint frames of information on a channel may be grouped into a frame interlace. For example, in FIG. 3, frames 1, 4, and 7 are grouped into a first frame interlace {x1, x2, x3, . . . }, and frames 2, 5, and 8 are grouped into a second frame interlace {y1, y2, y3, . . . }.

In one embodiment, data channel information may be communicated by at least one frame of a first frame interlace, and the control channel information may be communicated by at least one frame of a second fame interlace. For example, in FIG. 3, data is communicated by two hop regions 302, 304 in the first frame x1, and two hop regions 306, 308 in the second frame x2, belonging to the first frame interlace. Similarly, control information is communicated by two hop regions 312, 314 in the first frame y1, and two hop regions 316, 318 in the second frame y2, belonging to the second frame interlace. The first frame interlace and the second frame interlace may have different or same formats and/or structures.

In one embodiment, control information on a first control channel may be communicated by at least one hop region in a frame of an interlace, and the control channel information on a second control channel may be communicated by at least one different or disjoint hop region in the same frame of the interlace. For example, in FIG. 3, control information of a first control channel C1, e.g., ACK/NACK, is communicated by hop region 312 in the first frame y1, and control information of a second control channel C2, e.g., REQ/CQI, is communicated by hop region 314 in the first frame y1.

There may be situations where a user needs more control channel resources than provided by a single control channel. For example, MIMO users may need more bits for CQI since the channel is described by a matrix rather than a scalar. Similarly, more bits may be needed for ACK/NACK control channel for a MIMO user, since in the MIMO case, a separate ACK/NACK may be needed for each layer of MIMO transmission. In one embodiment, multiple control channels, e.g., on different interlaces, may be assigned to the same user.

Figure 4:
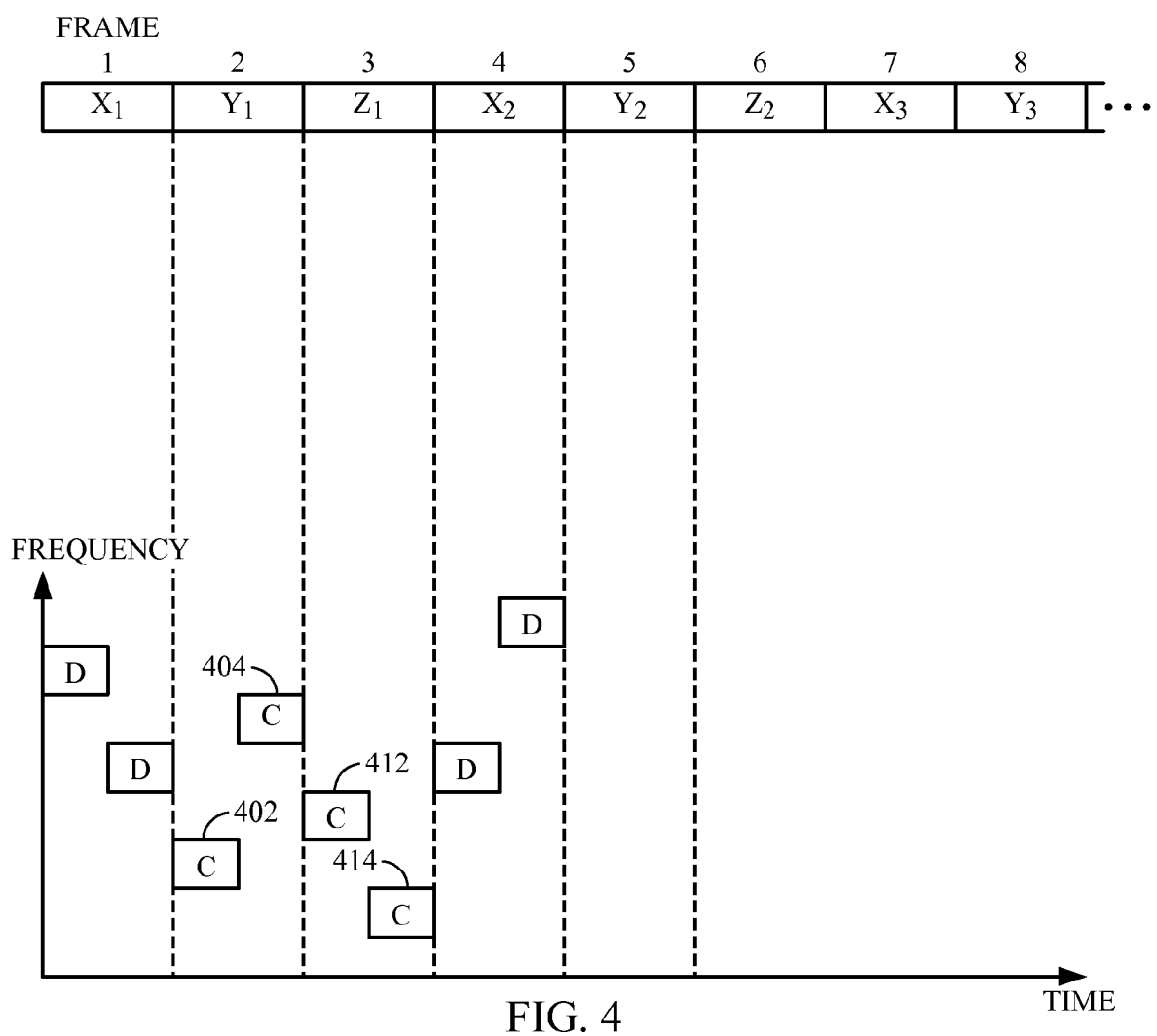
FIG. 4 shows another embodiment for data and control channels assignment in a communication network.

For example, as in FIG. 4, at least two frame interlaces {y1, y2, y3, . . . } and {z1, z2, z3, . . . } of control channel are assigned to the same user, whose data channel may have been assigned to frame interlace {x1, x2, x3, . . . }. Here, hop regions 402 and 404 in frame y1 and hop regions 412 and 414 in frame z1 are assigned to one or more control channels for the same user. As discussed above, if more than one control channel were assigned to the same frame, the control channels may each be assigned to a different hop region of the same frame, e.g., hop regions 402/412 and 404/414 may carry different control channels. In this example, a first control channel, e.g., ACK/NACK, is carried on hop regions 404 and 414, and a second control channel e.g., REQ/CQI, is carried on hop regions 402 and 412.

In the embodiments discussed above for assigning data and control channels to unique hop regions in specific frames, and/or interlaces, such time and/or frequency assignments may be communicated to an AP/AT. In one embodiment, the AP/AT may send separate messages for data channel and control channel assignments, which generally increase air-interface overheads. Alternatively, the control channel assignment is made dependent on the data channel assignment, thus; reducing the number of messages.

In one embodiment, the allocation of the control channels, i.e., the Walsh code and the time-frequency grid positions that the access terminal may use for uplink control transmissions, may be made implicit in the downlink transmission(s) to avoid having to signal multiple messages over the air-interface. In one embodiment, a first, e.g., REQ/CQI, control channel allocation is determined based on the user's MAC-ID, and a second control channel, e.g., ACK/NACK, allocation is based on the user's MAC-ID and/or the channel-ID of the forward-link channel which is being acknowledged.

In one embodiment, a unique identification code, e.g., MAC-ID is assigned to each access terminal (AT), and time, frequency and code assignment for a RL control channel, e.g., REQ/CQI, may correspond to the unique identification code, e.g. MAC-ID. In one embodiment, the unique identification code's association with the corresponding RL control channel assignment is maintained in a database, in the form of a table, e.g., at the AT. For example, knowing an AT's MAC-ID, the corresponding assigned hop regions for the REQ/CQI control channel may be found from a table.

In one embodiment, information about a data channel, e.g., channel-ID, and/or the information on a FL data channel directed to an AT, may correspond to the specific hop regions that the RL control channel may be communicated on. For example, a forward-link data channel assignment message may correspond to specific hop regions assigned to a control channel e.g., ACK/NACK, in a table maintained in a database at the AT.

Figure 5:
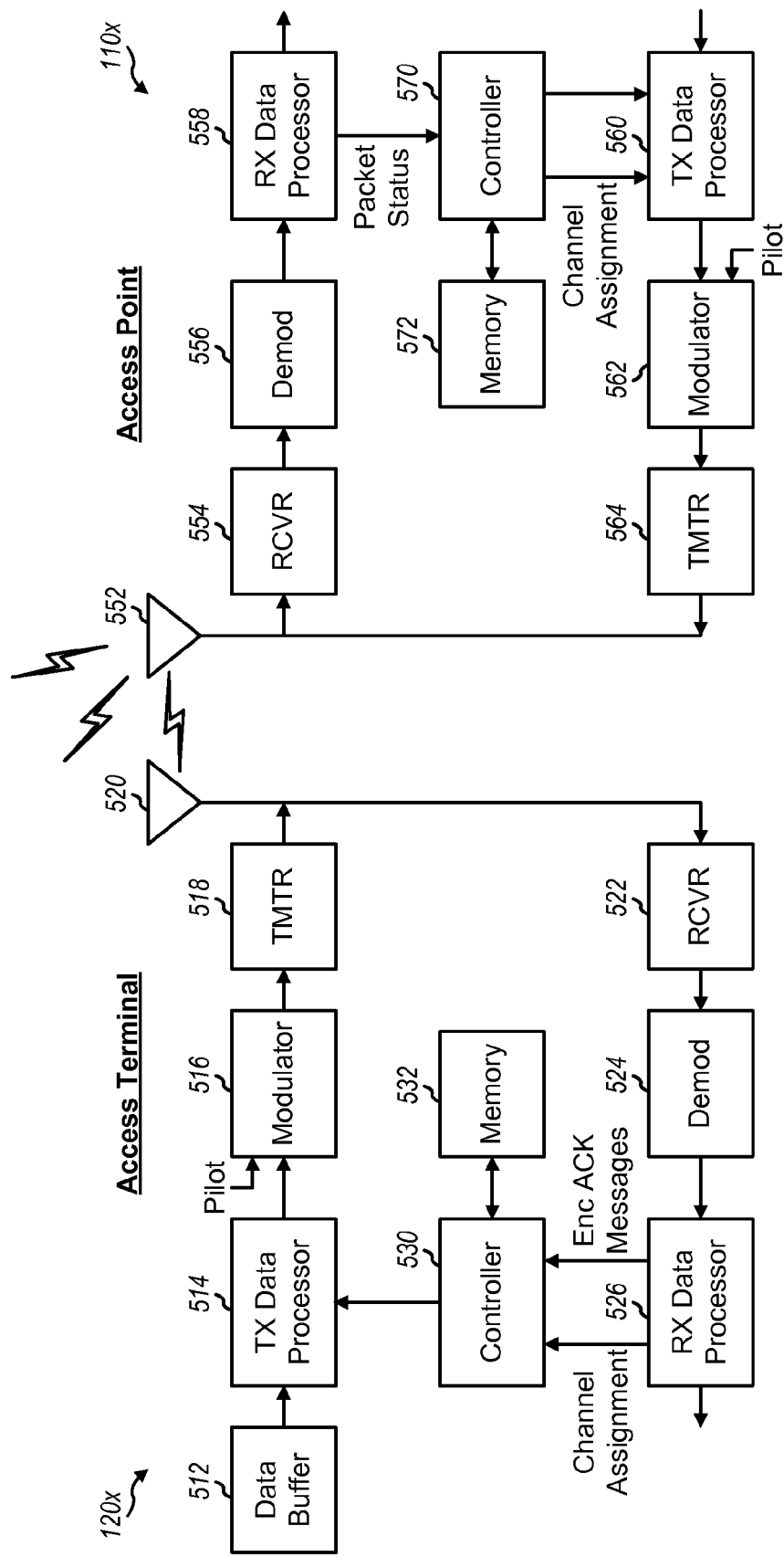
FIG. 5 shows a block diagram of an access point and an access terminal.

FIG. 5 shows a block diagram of an access point 110x and an access terminal 120x, for implementing the disclosed embodiments as discussed above in connection with FIG. 1 through FIG. 4. For the reverse link, at terminal 120x, a transmit (TX) data processor 514 receives traffic data from a data buffer 512, processes (e.g., encodes, interleaves, and symbol maps) each data packet based on a selected coding and modulation scheme, and provides data symbols. A data symbol is a modulation symbol for data, and a pilot symbol is a modulation symbol for pilot (which is known a priori). A modulator 516 receives the data symbols, pilot symbols, and possibly signaling for the reverse link, performs (OFDM) modulation and/or other processing as specified by the system, and provides a stream of output chips. A transmitter unit (TMTR) 518 processes (e.g., converts to analog, filters, amplifies, and frequency upconverts) the output chip stream and generates a modulated signal, which is transmitted from an antenna 520.

At access point (AP) 110x, the modulated signals transmitted by terminal 120x and other terminals in communication with access point 110x are received by an antenna 552. A receiver unit (RCVR) 554 processes (e.g., conditions and digitizes) the received signal from antenna 552 and provides received samples. A demodulator (Demod) 556 processes (e.g., demodulates and detects) the received samples and provides detected data symbols, which are noisy estimate of the data symbols transmitted by the terminals to AP 110x. A receive (RX) data processor 558 processes (e.g., symbol demaps, deinterleaves, and decodes) the detected data symbols for each terminal and provides decoded data for that terminal.

For the forward link, at AP 110x, traffic data is processed by a TX data processor 560 to generate data symbols. A modulator 562 receives the data symbols, pilot symbols, and signaling for the forward link, performs (OFDM) modulation and/or other pertinent processing, and provides an output chip stream, which is further conditioned by a transmitter unit 564 and transmitted from antenna 552. The forward-link signaling may include power control commands generated by a controller 570 for all terminals transmitting on the reverse link to AP 110x. At terminal 120x, the modulated signal transmitted by AP 110x is received by antenna 520, conditioned and digitized by a receiver unit 522, and processed by a demodulator 524 to obtain detected data symbols. An RX data processor 526 processes the detected data symbols and provides decoded data for the terminal and the forward-link signaling. Controller 530 receives the power control commands, and controls data transmission and transmit power on the reverse link to AP 110x. Controllers 530 and 570 direct the operation of terminal 120x and access point 110x, respectively. Memory units 532 and 572 store program codes and data used by controllers 530 and 570, respectively, for implementing the disclosed control channel allocation techniques.

The signaling transmission techniques described herein may be implemented by various means. For example, these techniques may be implemented in hardware, software, or a combination thereof. For a hardware implementation, the processing units used to process (e.g., compress and encode) signaling may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units used to decode and decompress the signaling may also be implemented with one or more ASICs, DSPs, and so on.

For a software implementation, the signaling transmission techniques may be implemented with modules (e.g., procedures, functions, and so on) that perform the functions described herein. The software codes may be stored in a memory unit (e.g., memory unit 532 or 572 in FIG. 5) and executed by a processor (e.g., controller 530 or 570). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for communicating control information in a wireless communication network, the method comprising:
    receiving one or more assignment messages, wherein each of the one or more assignment messages pertains to a set of disjoint hop regions within a frame of a frame interlace, and wherein the one or more assignment messages assign a first hop region of the set of disjoint hop regions to a first control channel and assign a second hop region of the set of disjoint hop regions to a second control channel;
    transmitting control information on the first control channel using the first hop region; and
    transmitting control information on the second control channel using the second hop region.

2. The method of claim 1, wherein at least one of the first control channel and the second control channel is an acknowledge/negative-acknowledge (ACK/NACK) channel.

3. The method of claim 1, wherein at least one of the first control channel and the second control channel is used to request forward link (FL) resources.

4. The method of claim 1, wherein the first hop region and the second hop region are assigned so that the transmitting control information on the first control channel and the transmitting control information on the second control channel are not simultaneous.

5. An apparatus for communicating control information in a wireless communication network, the apparatus comprising:
 means for receiving one or more assignment messages, wherein each of the one or more assignment messages pertains to a set of disjoint hop regions within a frame of a frame interlace, and wherein the one or more assignment messages assign a first hop region of the set of disjoint hop regions to a first control channel and assign a second hop region of the set of disjoint hop regions to a second control channel;
 means for transmitting control information on the first control channel using the first hop region; and
 means for transmitting control information on the second control channel using the second hop region.

6. The apparatus of claim 5, wherein at least one of the first control channel and the second control channel is an acknowledge/negative-acknowledge (ACK/NACK) channel.

7. The apparatus of claim 6, wherein at least one of the first control channel and the second control channel is used to request forward link (FL) resources.

8. The apparatus of claim 6, wherein the first hop region and the second hop region are assigned so that the transmitting control information on the first control channel and the transmitting control information on the second control channel are not simultaneous.

9. A computer-program product for communicating control information in a wireless communication network, the computer-program product comprising a non-transitory computer readable storage medium with computer-readable instructions stored thereon, the computer-readable instructions operable for causing a processor to:
 receive one or more assignment messages, wherein each of the one or more assignment messages pertains to a set of disjoint hop regions within a frame of a frame interlace, wherein the one or more assignment messages assign a first hop region of the set of disjoint hop regions to a first control channel and assign a second hop region of the set of disjoint hop regions to a second control channel;
 transmit control information on the first control channel using the first hop region; and
 transmit control information on the second control channel using the second hop region.

10. The computer-program product of claim 9, wherein at least one of the first control channel and the second control channel is an acknowledge/negative-acknowledge (ACK/NACK) channel.

11. The computer-program product of claim 9, wherein at least one of the first control channel and the second control channel is used to request forward link (FL) resources.

12. The computer-program product of claim 9, wherein the first hop region and the second hop region are assigned so that transmitting control information on the first control channel and transmitting control information on the second control channel are not simultaneous.

13. An apparatus for communicating control information in a wireless communication network, the apparatus comprising:
 one or more processors for:
  receiving one or more assignment messages, wherein each of the one or more assignment messages pertains to a set of disjoint hop regions within a frame of a frame interlace, wherein the one or more assignment messages assign a first hop region of the set of disjoint hop regions to a first control channel and assign a second hop region of the set of disjoint hop regions to a second control channel;
  transmitting control information on the first control channel using the first hop region; and
  transmitting control information on the second control channel using the second hop region; and
 memory coupled to the one or more processors.

14. A method for communicating control channel information in a wireless communication network, the method comprising:
 transmitting one or more assignment messages pertaining to a set of disjoint hop regions within a frame of a frame interlace, wherein the one or more assignment messages assigns a first hop region of the set of disjoint hop regions to a first control channel, and assigns a second hop region of the set of disjoint hop regions to a second control channel;
 receiving first control information transmitted on the first control channel using the first hop region; and
 receiving second control channel information transmitted on the second control channel using the second hop region.

15. The method of claim 14, wherein at least one of the first control channel and the second control channel is an acknowledge/negative-acknowledge (ACK/NACK) channel.

16. The method of claim 14, wherein at least one of the first control channel and the second control channel is used to request forward link (FL) resources.

17. The method of claim 14, wherein the first hop region and the second control hop region are assigned so that transmission of the first control information and transmission of the second control information are not simultaneous.

18. An apparatus for communicating control channel information in a wireless communication network, the apparatus comprising:
 means for transmitting one or more assignment messages pertaining to a set of disjoint hop regions within a frame of a frame interlace, wherein the one or more assignment messages assigns a first hop region of the set of disjoint hop regions to a first control channel, and assigns a second hop region of the set of disjoint hop regions to a second control channel;
 means for receiving first control information transmitted on the first control channel using the first hop region; and
 means for receiving second control channel information transmitted on the second control channel using the second hop region.

19. The apparatus of claim 18, wherein at least one of the first control channel and the second control channel is an acknowledge/negative-acknowledge (ACK/NACK) channel.

20. The apparatus of claim 18, wherein at least one of the first control channel and the second control channel is used to request forward link (FL) resources.

21. The apparatus of claim 18, wherein the first hop region and the second hop region are assigned so that transmission of the first control information and transmission of the second control information are not simultaneous.

22. A computer-program product for communicating control information in a wireless communication network, the computer-program product comprising a non-transitory computer readable storage medium with computer-readable instructions stored thereon, the computer-readable instructions operable for causing a processor to:
 transmit one or more assignment messages pertaining to a set of disjoint hop regions within a frame of a frame interlace, wherein the one or more assignment messages assigns a first hop region of the set of disjoint hop regions to a first control channel, and assigns a second hop region of the set of disjoint hop regions to a second control channel;

receive first control information transmitted on the first control channel using the first hop region; and receive second control channel information transmitted on the second control channel using the second hop region.

23. An apparatus for communicating control information in a wireless communication network, the apparatus comprising:

one or more processors for:
transmitting one or more assignment messages pertaining to a set of disjoint hop regions within a frame of a frame interlace, wherein the one or more assignment messages assigns a first hop region of the set of disjoint hop regions to a first control channel, and assigns a second hop region of the set of disjoint hop regions to a second control channel;
receiving first control information transmitted on the first control channel using the first hop region; and
receiving second control channel information transmitted on the second control channel using the second hop region; and memory coupled to the one or more processors.

24. A method for demodulating a control channel in a wireless communication network, the method comprising:
receiving a first number of modulation symbols assigned to a hop region for a control channel, wherein a second number of users is assigned the first number of modulation symbols, and wherein, in order to provide uniform interference to other sectors over the hop region, the second number of users is enabled to transmit control data on each modulation symbol assigned to the hop region of the control channel; and
demodulating the control channel based on the received first number of modulation symbols of the hop region.

25. The method of claim 24, wherein a plurality of the second number of users is allocated to at least one of the first number of modulation symbols.

26. The method of claim 24, wherein each of a plurality of the second number of users assigned to the same modulation symbol of the first number of modulation symbols is assigned a unique Walsh code.

27. The method of claim 24, wherein each of the second number of users is allocated to at least one of the first number of modulation symbols such that no two users overlap in any one of the first number of modulation symbols.

28. The method of claim 24, wherein at least one pilot embedded within the control channel is used for controlling reverse-link timing.

29. The method of claim 24, wherein the wireless communication network further comprises an orthogonal frequency division multiple access (OFDMA) air-interface.

30. The method of claim 24, wherein each user assigned to a same hop region is assigned a unique Walsh code.

31. The method of claim 30, wherein some Walsh codes are not assigned to any user, and wherein the Walsh codes that are not assigned are used to measure a current interference power on a reverse link.

32. An apparatus for demodulating a control channel in a wireless communication network, the apparatus comprising:
means for receiving a first number of modulation symbols assigned to a hop region for a control channel, wherein a second number of users is assigned the first number of modulation symbols, and wherein, in order to provide uniform interference to other sectors over the hop region, the second number of users is enabled to transmit control data on each modulation symbol assigned to the hop region of the control channel; and
means for demodulating the control channel based on the received first number of modulation symbols of the hop region.

33. The apparatus of claim 32, wherein a plurality of the second number of users is allocated to at least one of the first number of modulation symbols.

34. The apparatus of claim 32, wherein each of a plurality of the second number of users assigned to the same modulation symbol of the first number of modulation symbols is assigned a unique Walsh code.

35. The apparatus of claim 32, wherein each of the second number of users is allocated to at least one of the first number of modulation symbols such that no two users overlap in any one of the first number of modulation symbols.

36. The apparatus of claim 32, wherein at least one pilot embedded within the control channel is used for controlling reverse-link timing.

37. The apparatus of claim 32, wherein the wireless communication network further comprises an orthogonal frequency division multiple access (OFDMA) air-interface.

38. The apparatus of claim 32, wherein each user assigned to a same hop region is assigned a unique Walsh code.

39. The apparatus of claim 38, wherein some Walsh codes are not assigned to any user, and wherein the Walsh codes that are not assigned are used to measure a current interference power on a reverse link.

40. A computer-program product for communicating control information in a wireless communication network, the computer-program product comprising a non-transitory computer readable storage medium with computer-readable instructions stored thereon, the computer-readable instructions operable for causing a processor to:
receive a first number of modulation symbols assigned to a hop region for a control channel, wherein a second number of users is assigned the first number of modulation symbols, and wherein, in order to provide uniform interference to other sectors over the hop region, the second number of users is enabled to transmit control data on each modulation symbol assigned to the hop region of the control channel; and
demodulate the control channel based on the received first number of modulation symbols of the hop region.

41. An apparatus for communicating control information in a wireless communication network, the apparatus comprising:
one or more processors for:
receiving a first number of modulation symbols assigned to a hop region for a control channel, wherein a second number of users is assigned the first number of modulation symbols, and wherein, in order to provide uniform interference to other sectors over the hop region, the second number of users is enabled to transmit control data on each modulation symbol assigned to the hop region of the control channel; and
demodulating the control channel based on the received first number of modulation symbols of the hop region; and
memory coupled to the one or more processors.

* * * * *